US009045049B2

(12) United States Patent
Hershey et al.

(10) Patent No.: US 9,045,049 B2
(45) Date of Patent: Jun. 2, 2015

(54) SYSTEM AND METHOD FOR IN SITU CHARGING OF A REMOTE VEHICLE

(75) Inventors: Daniel David Hershey, Pepperell, MA (US); Victory Fay, Andover, MA (US); James Carl, Littleton, MA (US); Robert Connors, Tewksbury, MA (US)

(73) Assignee: iRobot Corporation, Bedford, MA (US)

( * ) Notice: Subject to any disclaimer, the term of this patent is extended or adjusted under 35 U.S.C. 154(b) by 338 days.

(21) Appl. No.: 13/597,243

(22) Filed: Aug. 28, 2012

(65) Prior Publication Data
US 2013/0049687 A1 Feb. 28, 2013

Related U.S. Application Data

(60) Provisional application No. 61/528,260, filed on Aug. 28, 2011.

(51) Int. Cl.
*H02J 7/00* (2006.01)
*H02J 7/02* (2006.01)
*B60L 11/18* (2006.01)

(52) U.S. Cl.
CPC .............. *B60L 11/1818* (2013.01); *Y02E 60/12* (2013.01); *Y02T 90/12* (2013.01); *H02J 7/0042* (2013.01); *H02J 7/0045* (2013.01); *H02J 7/0047* (2013.01); *H02J 2007/0096* (2013.01); *H02J 2007/0098* (2013.01); *B60L 2200/40* (2013.01); *Y02T 10/7005* (2013.01); *Y02T 90/14* (2013.01)

(58) Field of Classification Search
CPC ...... Y20E 60/12; H02J 7/0045; H02J 7/0042; Y02T 90/12; Y02T 90/14
USPC .................... 320/107, 111–113, 109
See application file for complete search history.

(56) References Cited

U.S. PATENT DOCUMENTS

| 2,778,158 | A * | 1/1957 | Ernst .............................. 446/433 |
| 6,721,400 | B2 * | 4/2004 | Schelberg et al. ......... 379/93.12 |
| 6,762,586 | B2 * | 7/2004 | Choi .............................. 320/107 |
| 7,417,404 | B2 * | 8/2008 | Lee et al. ...................... 320/115 |
| 7,679,524 | B2 * | 3/2010 | Hofer et al. ................. 340/12.22 |
| 8,172,580 | B1 * | 5/2012 | Chen et al. ...................... 439/39 |
| 8,327,960 | B2 * | 12/2012 | Couture et al. ................ 180/9.1 |
| 8,461,803 | B2 * | 6/2013 | Cohen et al. .................. 320/109 |
| 8,564,243 | B2 * | 10/2013 | Chen et al. .................... 320/108 |
| 8,749,196 | B2 * | 6/2014 | Cohen et al. .................. 320/109 |
| 8,796,990 | B2 * | 8/2014 | Paparo et al. ................. 320/108 |
| 2004/0130290 | A1 * | 7/2004 | Dan .............................. 320/107 |
| 2005/0156562 | A1 * | 7/2005 | Cohen et al. .................. 320/107 |
| 2005/0212478 | A1 * | 9/2005 | Takenaka ...................... 320/107 |

(Continued)

*Primary Examiner* — Stacy Whitmore
(74) *Attorney, Agent, or Firm* — Honigman Miller Schwartz and Cohn LLP

(57) ABSTRACT

A system for in situ charging of at least one rechargeable power source of a remote vehicle. The system comprises a power recharger having contacts configured to supply power to the at least one rechargeable power source, and a chassis adapter at least partially enclosing the at least one rechargeable power source and retaining the at least one rechargeable power source on the remote vehicle, the chassis adapter including terminals connected to the at least one rechargeable power source and configured to mate with the power recharger to allow the power recharger to recharge the at least one rechargeable power source. The chassis adapter comprises charger input contacts including a positive contact, a ground, and one or more data contacts. The power recharger automatically disengages from the recharging terminals when the remote vehicle is driven away from the chassis adapter without damaging the power recharger.

18 Claims, 12 Drawing Sheets

(56) References Cited

U.S. PATENT DOCUMENTS

| | | | |
|---|---|---|---|
| 2006/0087286 A1* | 4/2006 | Phillips et al. | 320/114 |
| 2010/0085007 A1* | 4/2010 | Shu | 320/107 |
| 2010/0141207 A1* | 6/2010 | Phillips et al. | 320/114 |
| 2010/0194354 A1* | 8/2010 | Gotou et al. | 320/163 |
| 2010/0201309 A1* | 8/2010 | Meek | 320/108 |
| 2011/0050164 A1* | 3/2011 | Partovi et al. | 320/108 |
| 2011/0180334 A1* | 7/2011 | Rudakevych | 180/9.32 |
| 2011/0234153 A1* | 9/2011 | Abramson | 320/107 |
| 2011/0246014 A1* | 10/2011 | Sauper | 701/22 |
| 2012/0062170 A1* | 3/2012 | Li et al. | 320/107 |
| 2012/0097461 A1* | 4/2012 | Rudakevych | 180/9.32 |
| 2012/0098478 A1* | 4/2012 | Rich et al. | 320/101 |
| 2012/0101754 A1* | 4/2012 | Halme | 702/63 |
| 2012/0217925 A1* | 8/2012 | Chen et al. | 320/108 |
| 2012/0223673 A1* | 9/2012 | Chen et al. | 320/108 |
| 2013/0002193 A1* | 1/2013 | Aldana et al. | 320/107 |
| 2013/0049678 A1* | 2/2013 | Li | 320/107 |
| 2013/0049687 A1* | 2/2013 | Hershey et al. | 320/109 |
| 2013/0087399 A1* | 4/2013 | Slawinski et al. | 180/167 |
| 2013/0105233 A1* | 5/2013 | Couture et al. | 180/9.1 |
| 2013/0175983 A1* | 7/2013 | Partovi et al. | 320/108 |
| 2013/0271109 A1* | 10/2013 | Wang | 323/369 |
| 2014/0103864 A1* | 4/2014 | Song | 320/107 |
| 2014/0110183 A1* | 4/2014 | Rudakevych et al. | 180/9.32 |
| 2014/0167687 A1* | 6/2014 | Irie | 320/107 |
| 2014/0231156 A1* | 8/2014 | Rudakevych | 180/9.32 |

* cited by examiner

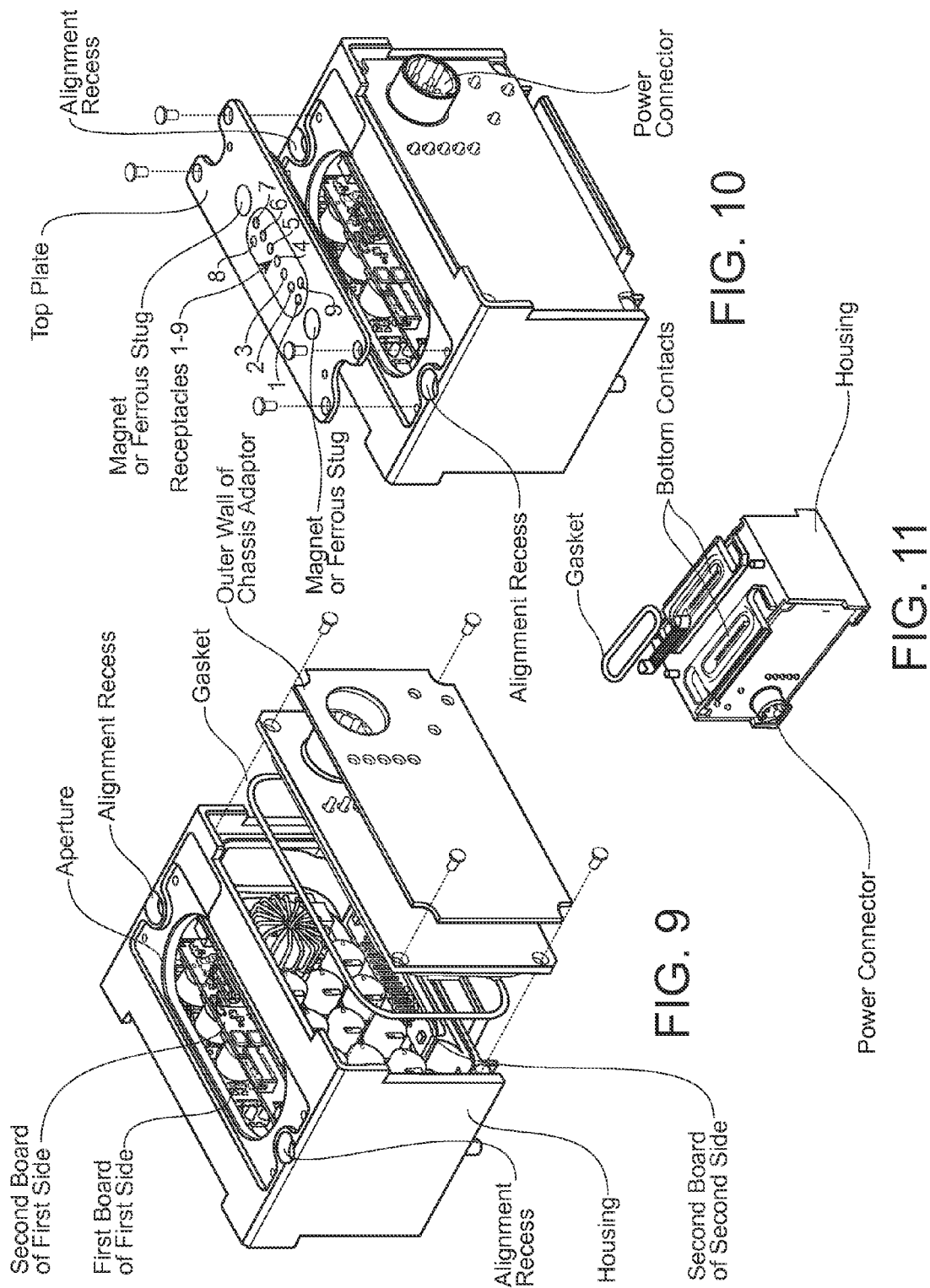

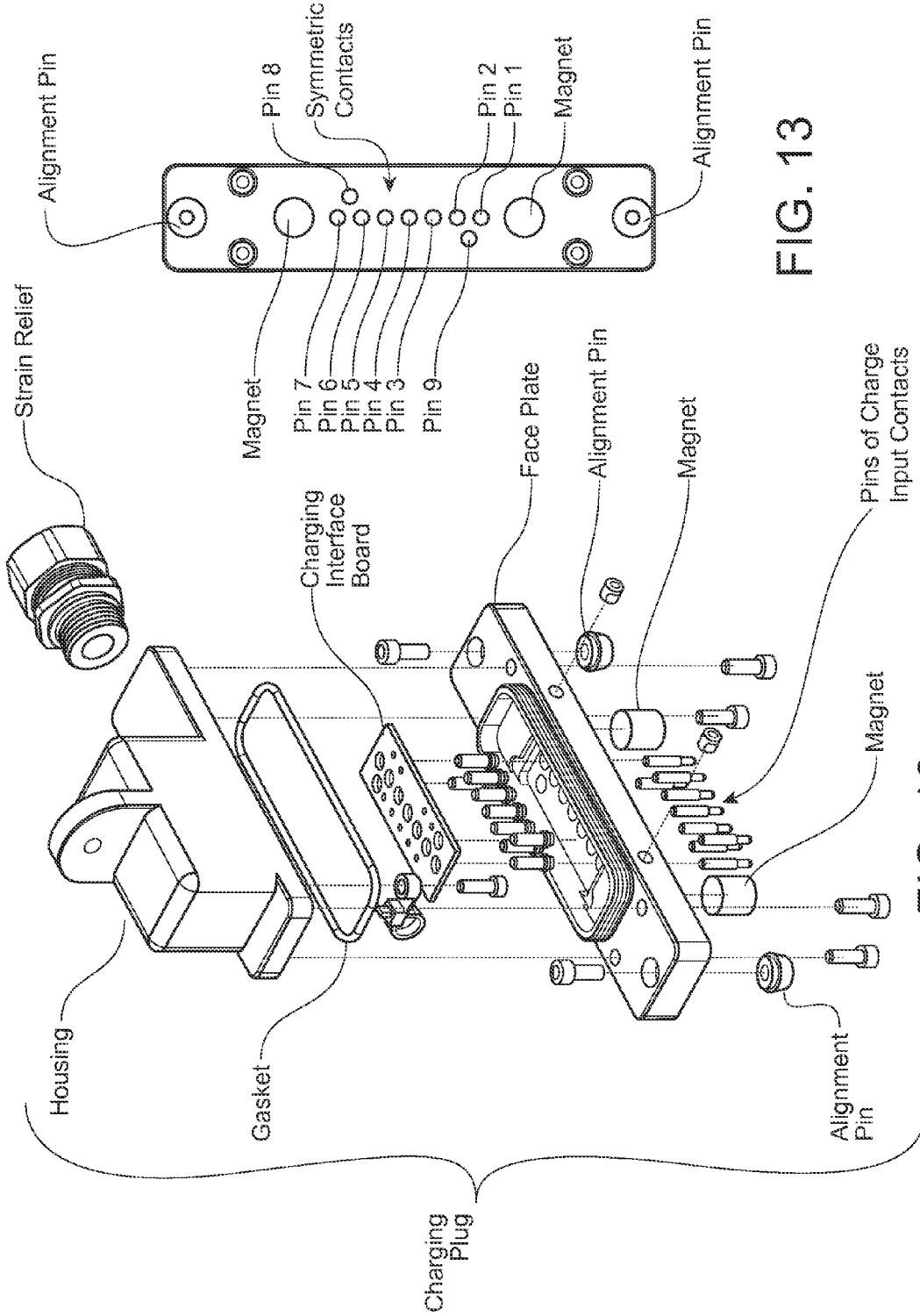

_US 9,045,049 B2_

SYSTEM AND METHOD FOR IN SITU CHARGING OF A REMOTE VEHICLE

INTRODUCTION

This application claims priority to U.S. Provisional Patent Application No. 61/528,260, filed Aug. 28, 2011, titled System and Method for In Situ Charging of a Remote Vehicle, the entire content of which is incorporated herein by reference.

The present teachings relate to a system and method for in situ charging of a remote vehicle, which utilizes a releasable charging mechanism.

BACKGROUND

Many remote vehicle such as, for example, mobile robots, include rechargeable power sources. The rechargeable power sources can include, for example, one or more batteries such as lithium-ion batteries (e.g., a BB-2590/U battery). Many mobile robots include two batteries. Periodically, or at least when the rechargeable battery falls below a predetermined charge level, the remote vehicle must be recharged at a charging station. Battery charges can include, for example, portable battery charges that can connect with from one to eight batteries. The portable chargers must be manually connected with the battery and manually disconnected from the battery. The remote vehicle therefore must be manually disengaged from the charger before returning to its mission. In fact, certain remote vehicles require removal of the battery or a certain amount of disassembly of the remote vehicle to obtain access to the one or more batteries for charging

SUMMARY

The present teachings provide a system for in situ charging of at least one rechargeable power source of a remote vehicle. The system comprises a power recharger having contacts configured to supply power to the at least one rechargeable power source, and a chassis adapter at least partially enclosing the at least one rechargeable power source and retaining the at least one rechargeable power source on the remote vehicle, the chassis adapter including terminals connected to the at least one rechargeable power source and configured to mate with the power recharger to allow the power recharger to recharge the at least one rechargeable power source. The chassis adapter comprises charger input contacts including a positive contact, a ground, and one or more data contacts. The power recharger automatically disengages from the recharging terminals when the remote vehicle is driven away from the chassis adapter without damaging the power recharger.

The at least one rechargeable power source can comprise two power sources. The rechargeable power sources can comprise rechargeable batteries. During charging, the remote vehicle can be powered on or off. The power recharger and the chassis adapter can further comprise magnets that allow the power recharger to releasably engage the chassis adapter during charging. The power recharger powers the remote vehicle directly while recharging the rechargeable power supply, so that the rechargeable power supply is not supplying power to the remote vehicle, which allows the power recharger to properly monitor the charging current and prevents current leaks that would interfere with the charging process.

The present teachings also provide a method for in situ charging of at least one rechargeable power source of a remote vehicle. The method comprises attaching a releasable power recharger to the at least one rechargeable power source, the releasable power recharger having contacts configured to supply power to the at least one rechargeable power source, and providing the a chassis adapter that at least partially encloses the at least one power source and retains the at least one power source on the remote vehicle. The chassis adapter includes terminals connected to the at least one rechargeable power source and configured to mate with the releasable power recharger to allow the releasable power recharger to recharge the at least one rechargeable power source. The chassis adapter comprising charger input contacts including a positive contact, a ground, and one or more data contacts. The method also comprises automatically disengaging the releasable power recharger from the recharging terminals when the remote vehicle is driven away from the releasable power recharger without damaging the releasable power recharger.

The at least one rechargeable power source can comprise two power sources. The rechargeable power sources can comprise rechargeable batteries. The method can include an option to turn the remote vehicle off or leave it on during recharging. The power recharger and the chassis adapter can further comprise magnets that allow the power recharger to releasably engage the chassis adapter during charging. The power recharger powers the remote vehicle directly while recharging the rechargeable power supply, so that the rechargeable power supply is not supplying power to the remote vehicle, which allows the power recharger to properly monitor the charging current and prevents current leaks that would interfere with the charging process.

The present teachings still further provide a system for in situ charging of at least two rechargeable power sources of a remote vehicle. The system comprises a remote vehicle and an operator control unit for controlling the remote vehicle. The system further comprises two power rechargers having contacts configured to supply power to the at least two rechargeable power sources, and two chassis adapters, each chassis adapter at least partially enclosing at least one respective rechargeable power source and retaining the respective at least one rechargeable power source on the remote vehicle. Each of the chassis adapters includes terminals connected to the respective at least one rechargeable power source and configured to mate with a power recharger to allow the power recharger to recharge the at least one rechargeable power source. Each of the chassis adapters also comprises charger input contacts including a positive contact, a ground, and one or more data contacts. The power rechargers automatically disengage from the respective chassis adapter when the remote vehicle is driven away from the chassis adapter without damaging the chassis adapter.

The at least one rechargeable power source can comprise two power sources. The power sources can comprise rechargeable batteries. During charging, the remote vehicle can be powered on or off. Each of the power rechargers and each of the chassis adapters further comprise magnets that allow the power recharger to releasably engage the chassis adapter during charging. Each of the power rechargers power the remote vehicle directly while recharging the respective rechargeable power supply, so that the rechargeable power supplies are not supplying power to the remote vehicle, which allows the power rechargers to properly monitor the charging current of a respective rechargeable power supply and prevents current leaks that would interfere with the charging process. The chassis adapters can be located on opposite sides of the remote vehicle, at a track center location. Each of the chassis adapters can comprise at least seven charger input contacts including a positive contact, a ground, and one or more data contacts.

Objects and advantages of the present teachings will be set forth in part in the description which follows, and in part will be obvious from the description, or may be learned by practice of the present teachings. The objects and advantages of the teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and, together with the description, serve to explain the principles of the teachings.

BRIEF DESCRIPTION OF THE DRAWINGS

FIG. 9 is an exploded view of the chassis adapter of FIG. 8.

FIG. 10 is another exploded view of the chassis adapter of FIG. 8

FIG. 11 illustrates a partially disassembled bottom view of a chassis adapter, showing a payload port on each side thereof.

FIG. 12 illustrates an exploded view of an exemplary embodiment of a charging plug that can be utilized to mate with a chassis adapter, for example the chassis adapter of FIGS. 8-11.

FIG. 13 illustrates an exemplary mating face of the charging plug face plate of FIG. 12.

DESCRIPTION OF THE EMBODIMENTS

Figure 1:
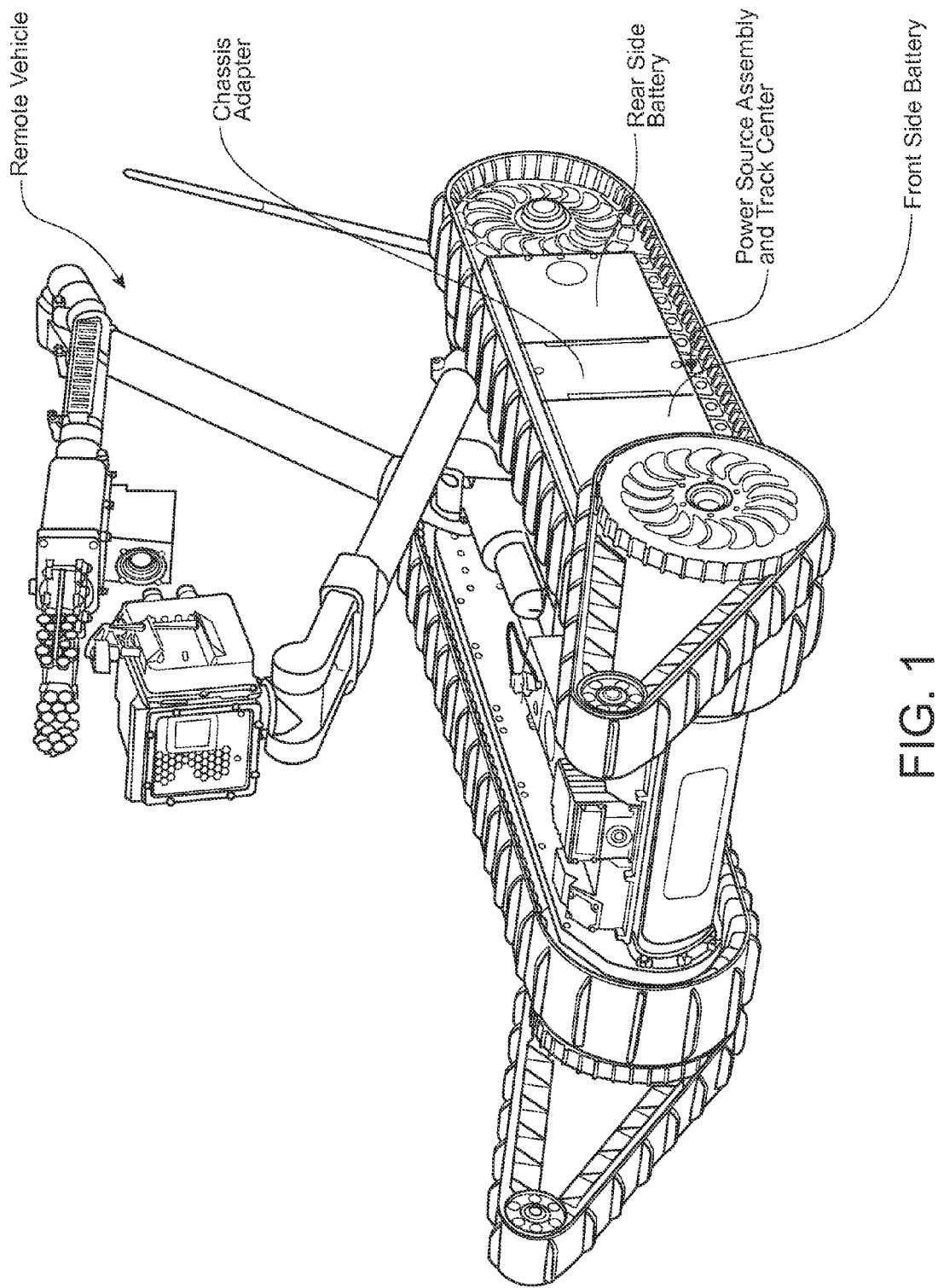
FIG. 1 is a side perspective view of a remote vehicle including a power source assembly located on a side thereof.

Reference will now be made in detail to embodiments of the present teachings, examples of which are illustrated in the accompanying drawings.

As used herein, the term remote vehicle refers to a vehicle controlled by a remotely-located operator. A remote vehicle can include, for example, a mobile robot such as an iRobot® unmanned ground vehicle (UGV). "In situ" charging refers to charging a rechargeable power source (e.g., one or more batteries) of a vehicle without removing the rechargeable power source from the remote vehicle. This can be accomplished by driving the vehicle sufficiently proximate a charging station so that a power source mechanism (e.g., a charging plug as describe hereinbelow) can be connected with charging terminals on the remote vehicle that are connected with the rechargeable power source and allow the power source mechanism to charge the power source.

The present teachings relate to in situ charging for a remote vehicle. In a specific exemplary embodiment of a system in accordance with the present teachings, the remote vehicle is an iRobot® Packbot and the rechargeable power source is a BB2590 battery. The system can include a BB2590 adapter through which charging occurs using a special charging connector or "chassis adapter" for the rechargeable power source. The present teachings contemplate that, during charging, the remote vehicle (e.g., the robot) can be powered on or powered off. If the remote vehicle remains powered on during charging, voltage can be supplied to power the remote vehicle on a separate power line, while power flow from the power source to the remote vehicle is automatically shut down during charging. Isolation of the power source from the remote vehicle when the remote vehicle is powered on a separate power line allows the charger to properly monitor the charging current and prevents current leaks that would interfere with the charging process. Although the present teachings preferably employ a commercial charger, the present teachings contemplate utilizing a custom charger made specifically for the remote vehicle in situ charging application described herein.

In a preferred embodiment of the present teachings, the remote vehicle can automatically disengage (e.g., with no human help aside from teleoperation of the remote vehicle) from the charging station, for example simply by driving (e.g., being teleoperated or performing an autonomous behavior). In certain embodiments, the remote vehicle can additionally automatically engage the charging station. The charging station can include a power source mechanism adapted to mate with (e.g., releasably engage) the chassis adapter to recharge the power source at the charging station.

Commercial chargers typically use a standard charging protocol and algorithm. Thus, to utilize a commercial charger, the power source to be recharged must be compatible with the standard charging protocol and algorithm. In other words, the power source must "look like" a standalone battery to the charger. In some existing power sources used in remote vehicles (e.g., a BB2590 battery used in an iRobot® PackBot), the strings are connected in series. Commercial chargers, however, typically charge each string independently with reference to the ground (e.g., in parallel). Therefore, to allow a power source used in a remote vehicle that has strings arranged in series to attach to a commercial charger configured to charge in parallel, the strings of the BB2590 can be reconfigured from series to parallel for charging, or the commercial charger can be customized to handle a "floating" string.

In an exemplary embodiment of the present teachings, each BB2590 battery consists of two independent batteries, called sections or strings. Each section is a 16V battery. If the powered device requires 16V, the two strings are connected in parallel. On the other hand, if the powered device requires 32V, the two strings are connected in series so that 16V+

16V=32V. One battery string can sit (electrically) atop the other, such that the negative terminal of the bottom battery is connected to the ground, while the negative terminal of the top battery is connected to the positive terminal of the bottom battery. This is how the strings are connected in an iRobot® PackBot that requires 32V.

Most commercial chargers are designed to work with unattached batteries, where strings are not connected to each other in any way. During the charging, the negative terminal of each string is connected to the ground potential of the charger, while the positive terminal receives 16V. For certain in-situ charging embodiments in accordance with the present teachings, the battery to be charged is installed in the robot and its two strings are connected in series with each other to provide 32V for the robot. If a commercial charger is attached to such a battery, the charger will attempt to connect the negative terminal of the top string to the ground and thus will short the bottom string. A custom charger, required for the in-situ charging, can charge the top string without grounding its negative terminal, i.e., the negative terminal will remain "floating" over the bottom string and therefore the bottom string will not be affected (shorted).

In a preferred embodiment of the present teachings permanent, unpowered magnets are employed on the charging plug and steel (ferrous) slugs are employed on the chassis adapter, although the present teachings alternatively contemplate the use of electromagnets.

It is desirable in accordance with various embodiments of the present teachings to minimize the size of the charging connector (e.g., the number of signals). To minimize the charging connector size, the commercial charger can charge batteries in a "dumb" mode to eliminate the need to run a serial communication link to each string saving, for example, eight wires per adapter. Alternatively or additionally, the commercial charger could emulate auxiliary signals, such as two signals required to recognize a battery type.

In accordance with various embodiments of the present teachings, the remote vehicle remains powered while the power source is being charged. This can be accomplished by providing a separate power line to power the remote vehicle for the duration of the charging. The presence of the voltage on the separate power line can automatically shut down the power flow from the power source to the remote vehicle. Isolation of the power source from the remote vehicle allows the charger to properly monitor the charging current and prevents current leaks that would interfere with the charging process.

The present teachings contemplate the charging system allowing automatic disengagement and engagement, for example by employing a flexible docking framework with suspended connectors and a combination of permanent magnets and electromagnets.

To simplify the logistics of in situ charging, the power source can be located on an outboard side of the remote vehicle. For a tracked remote vehicle, for example, the power source can be located between an upper portion of the track and a lower portion of the track and between a front wheel and a rear wheel, referred to as the track center and shown in FIG. 1. A frame can be located in the track center and have terminals facing forward and rearward. The frame can load a front-side battery and a rear-side battery, along with a chassis adapter located, for example, between the batteries and facing outward as shown in FIG. 2

A system for in situ charging of a remote vehicle power source in accordance with the present teachings can, but does not necessarily, an ability of the remote vehicle to drive away from the charger when it is done charging, without the need for assistance in disconnecting a power recharger or charging plug from the chassis adapter to which it mates and is releasably held (e.g., via a magnetic force). In accordance with various embodiments, the power recharger or chassis adapter can be disengaged from the chassis adapter at lower than breakaway tension.

FIG. 1 illustrates a tracked remote vehicle having a power source assembly including front and rear batteries (including, for example, two BB2590 batteries) and a chassis adapter located between the front and rear batteries. The power source assembly is preferably located on a single outboard side of the remote vehicle, but one skilled in the art will understand that power source assemblies can be located at different or more than one location on the remote vehicle.

Figure 2:
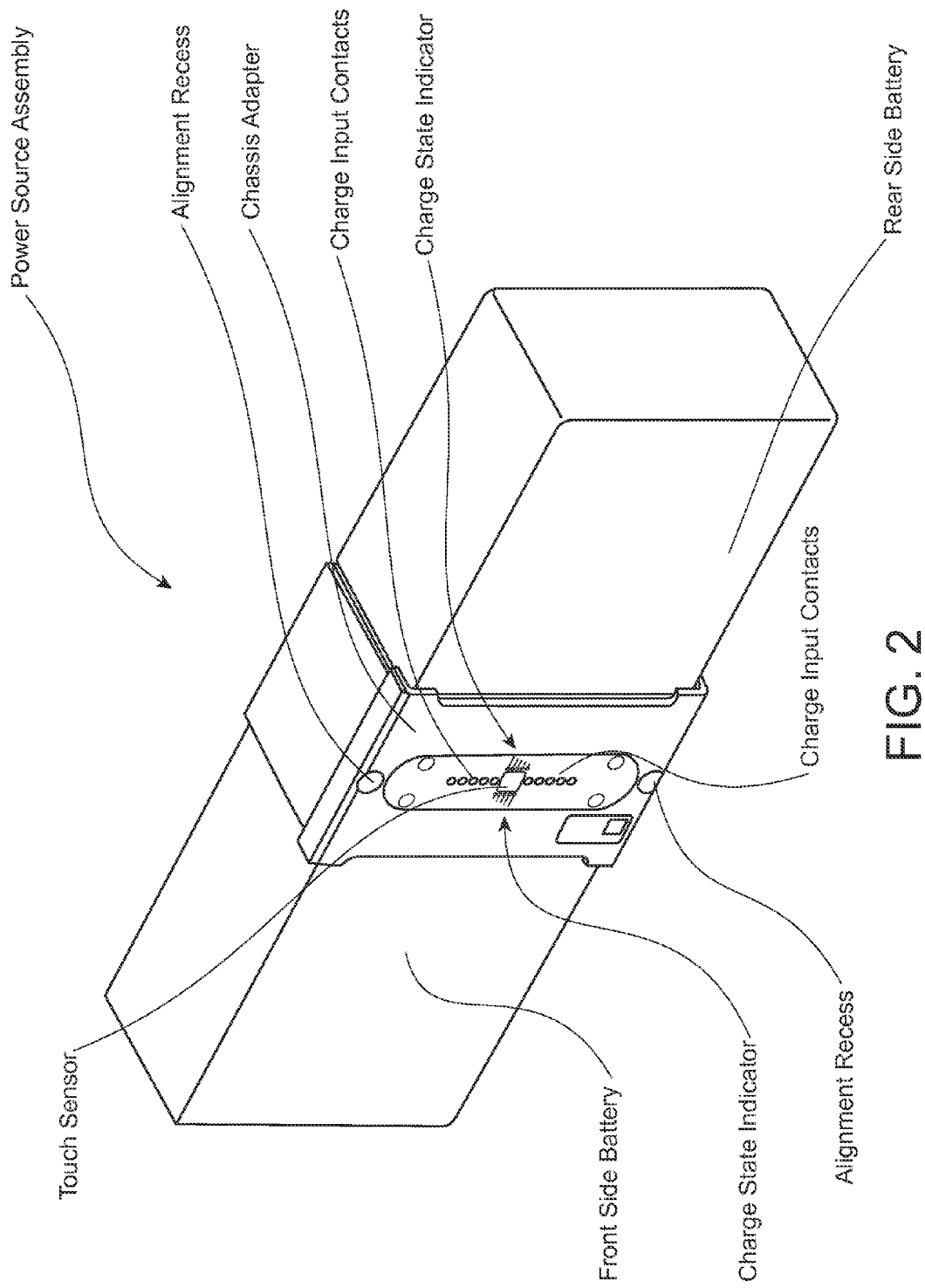
FIG. 2 is a side perspective view of an exemplary embodiment of a power source assembly in accordance with the present teachings.

FIG. 2 illustrates an exemplary power source assembly in accordance with the present teachings, the power source assembly includes a front side battery, a rear side battery, and a chassis adapter. The chassis adapter acts as an adapter allowing a power recharger or charging plug such as a commercial charger or custom charger to charge the first and second batteries. The illustrated exemplary chassis adapter can also include a touch sensor, charger input contacts for each battery, and state-of-charge indicators for each battery.

Figure 3:
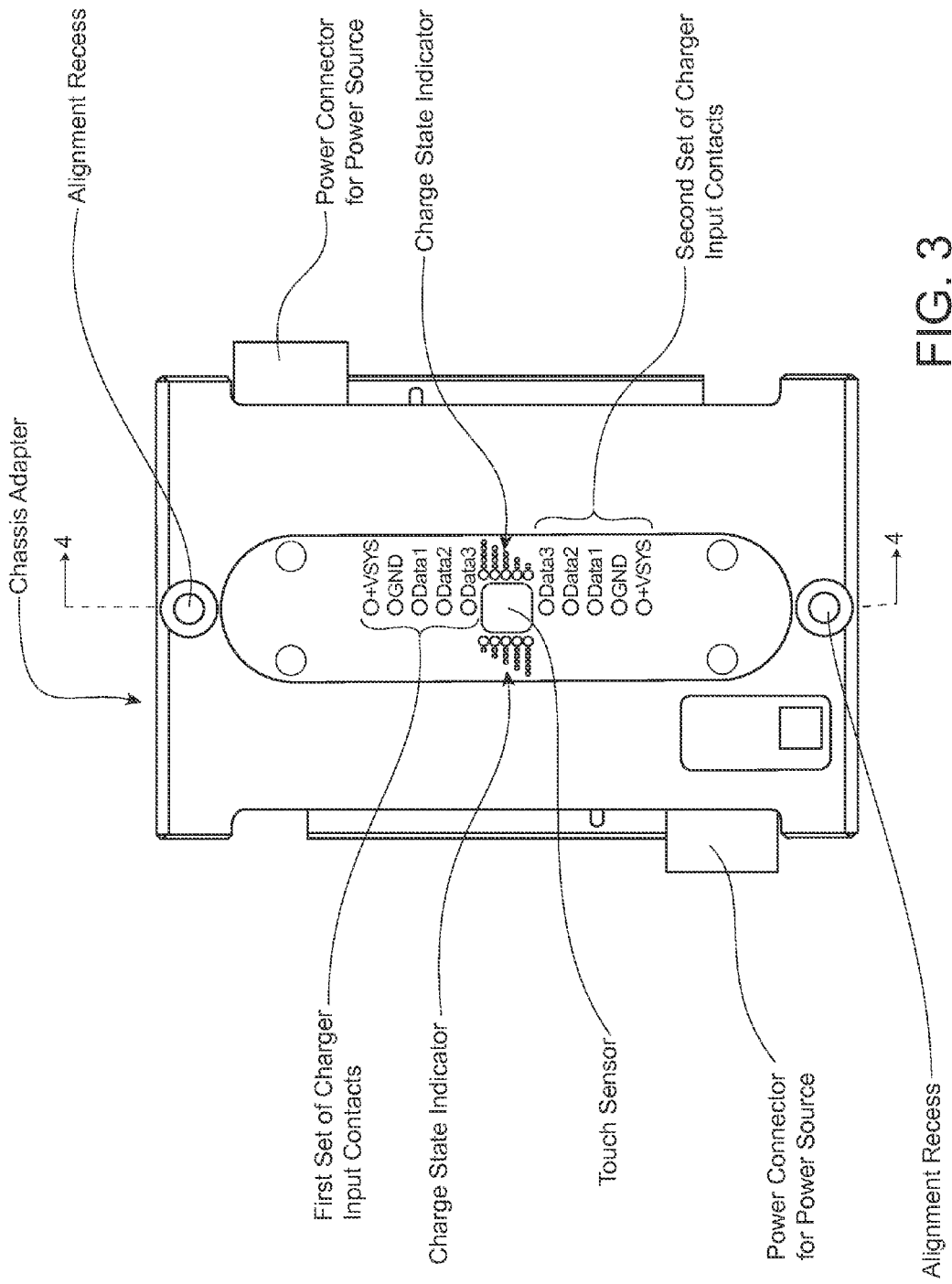
FIG. 3 is a side view of an exemplary embodiment of a chassis adapter in accordance with the present teachings.

As shown in the exemplary chassis adapter embodiment of FIG. 3, a first set of charger input contacts for the front side battery are shown above a second set of charger input contacts for the rear side battery, which mirror the first set of charger input contacts. Each set of charger input contacts includes, for example, a +VSYS (power input) contact, a GND (ground) contact, and three data DATA 1, DATA 2, and DATA contacts. A touch sensor is located between the first set of charger input contacts and the second set of charger input contacts, and can be used to activate state-of-charge indicators. The state-of-charge indicators can be located on either side of the centrally-located touch sensor as shown. Each side of the chassis adapter includes a power indicator and a status contact.

Figure 4:
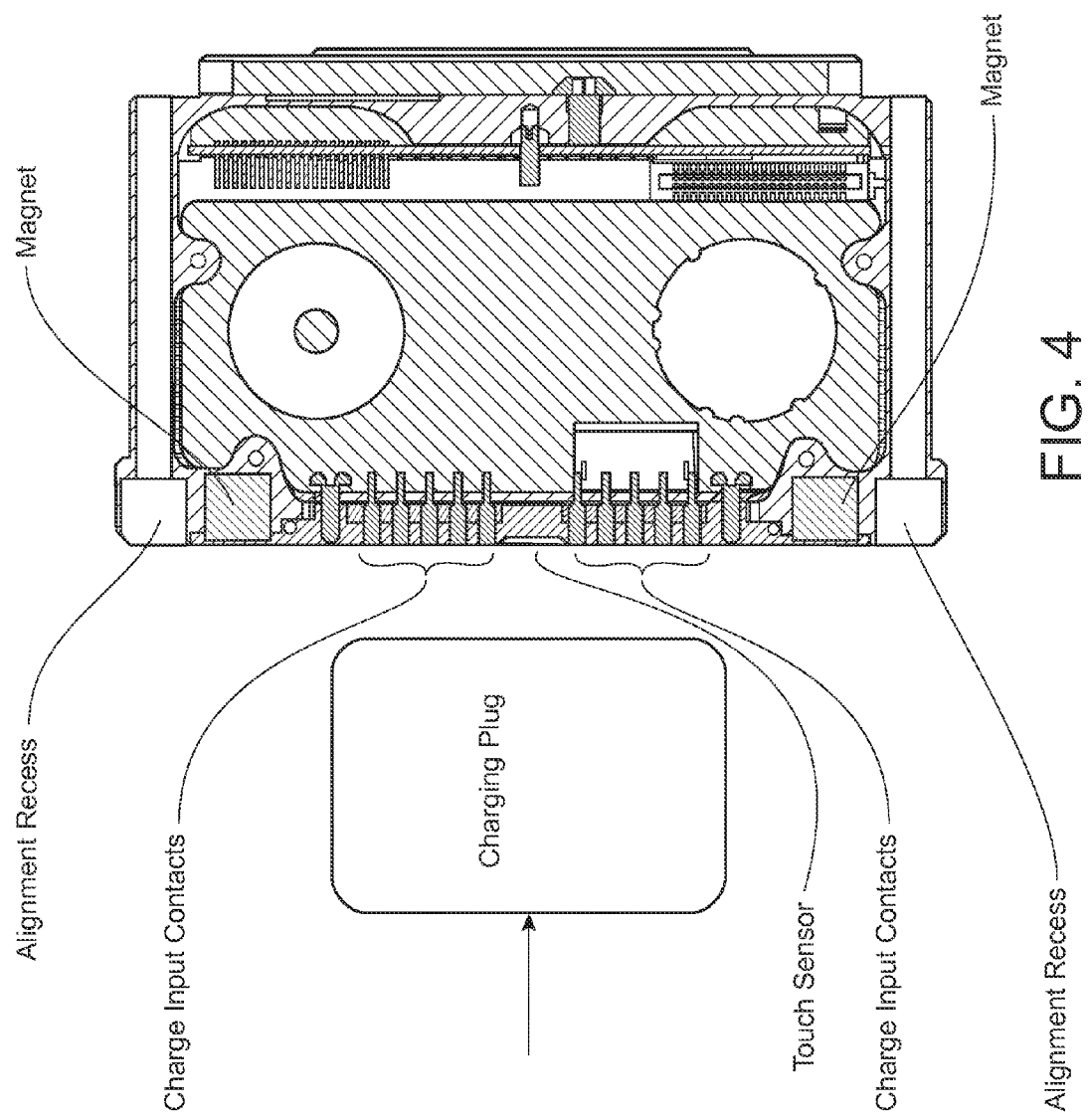
FIG. 4 is a cross sectional view of an exemplary embodiment of a power source assembly adapter of FIG. 3, taken along line 4-4 of FIG. 3.

FIG. 4 illustrates is a cross sectional view of an exemplary embodiment of a power source assembly adapter of FIG. 3, taken along line 4-4 of FIG. 3. The spaced sets of charger input contacts are shown, along with the centrally-located touch pad. Magnets are shown that can be used for releasable attachment of a power recharger (represented in FIG. 4 as a charging plug powered electromagnet) to the chassis adapter. Each magnet can be located, for example as shown in FIG. 4, spaced outwardly from a respective set of charger input contacts. The magnets can comprise, for example, single simple magnets or ferrous plate. In preferred embodiments of the present teachings, electromagnets in the charging plug are generally aligned with the chassis adapter magnets such that they can use their magnetic attraction to releasably engage the charging plug and the chassis adapter. The charging plug comprises contacts that preferably mate with each of the first and second sets of charging contacts of the chassis adapter.

Figure 5:
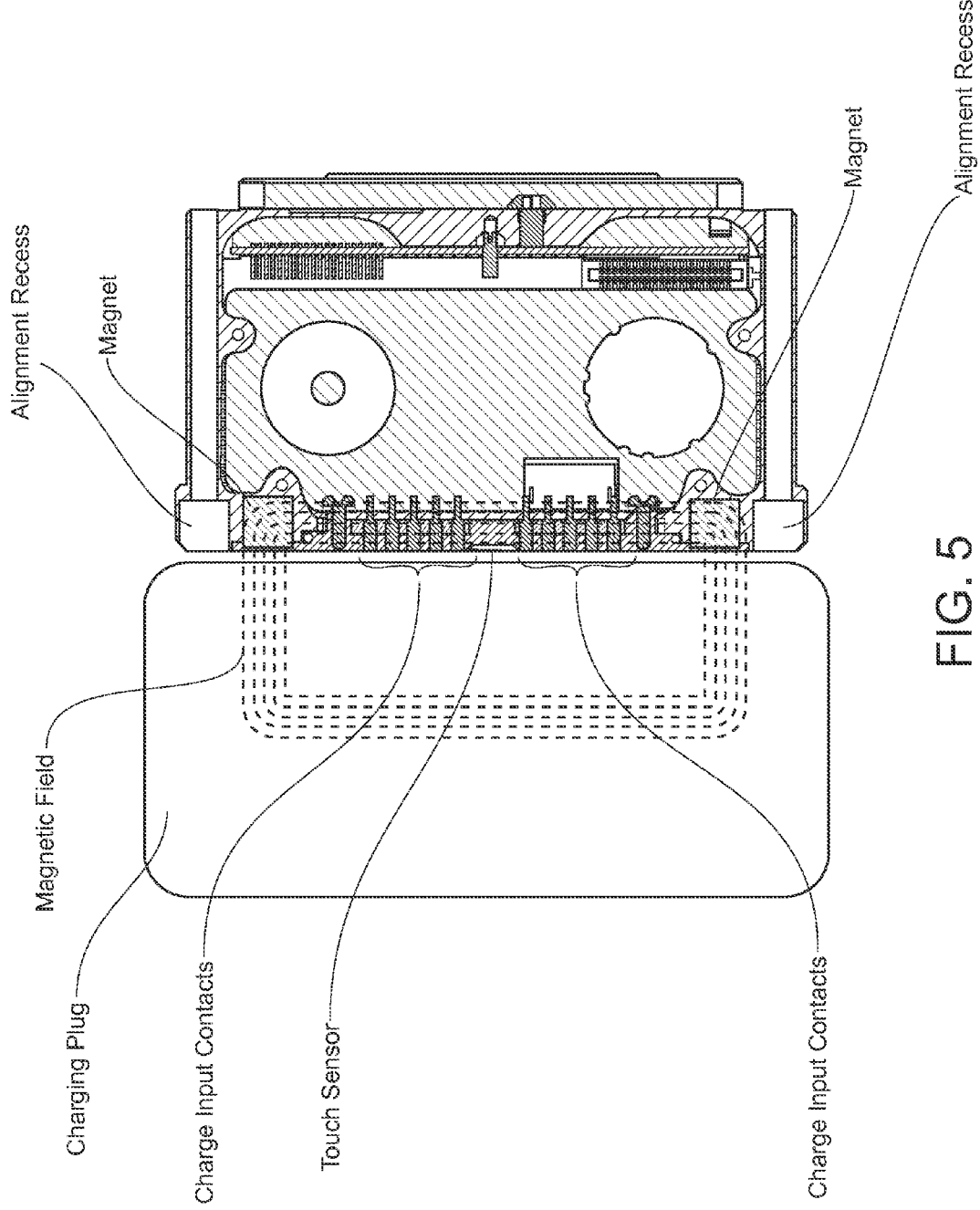
FIG. 5 is a cross sectional view of an exemplary embodiment of a power source assembly adapter of FIG. 3, taken along line 4-4 of FIG. 3, and including a schematically-illustrated charging plug and resulting magnetic field attracting the charging plug to the adapter.

FIG. 5 is a cross sectional view of an exemplary embodiment of a power source assembly adapter of FIG. 3, taken along line 4-4 of FIG. 3, and including a schematically-illustrated charging plug and resulting magnetic field attracting the charging plug to the adapter. The spaced sets of charger input contacts are shown, along with the centrally-located touch pad. Magnets are shown that can be used for releasable attachment of a power recharger (represented in FIG. 4 as a charging plug powered electromagnet) to the chassis adapter. Each magnet can be located, for example as shown in FIG. 4, spaced outwardly from a respective set of charger input contacts. The magnets can comprise, for example, single simple magnets or ferrous plate. In preferred embodiments of the present teachings, electromagnets in the charging plug are generally aligned with the chassis adapter magnets such that they can use their magnetic attraction to releasably engage the charging plug and the chassis adapter. The charging plug comprises contacts that preferably mate with each of the first and second sets of charging contacts of the chassis adapter. The magnets hold the charging plug to the chassis adapter via the illustrated magnetic field to keep the respective contacts engaged.

Figure 6:
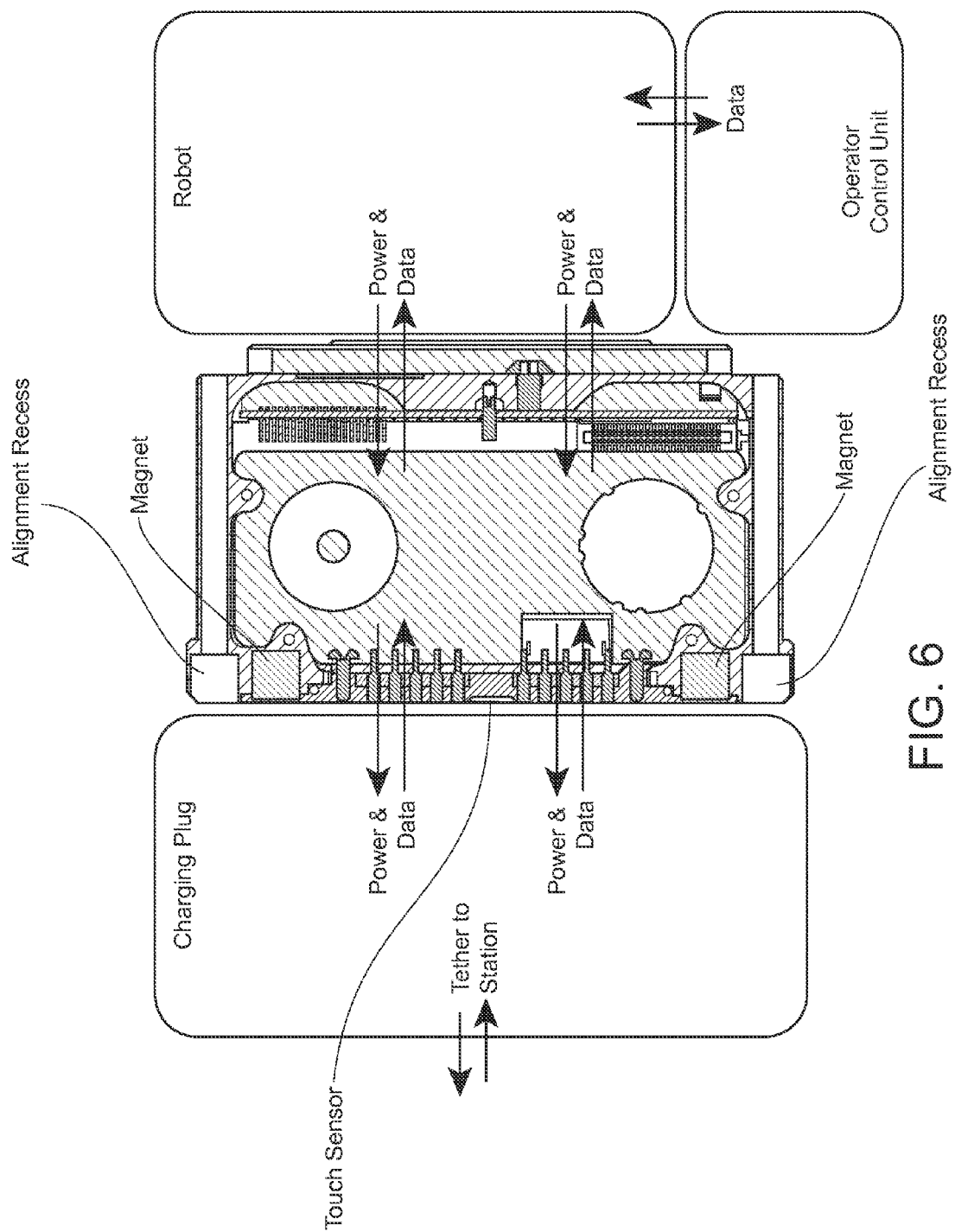
FIG. 6 is a cross sectional view of an exemplary embodiment of a chassis adapter of FIG. 3, taken along line 4-4 of FIG. 3, and including a schematically-illustrated charging plug, robot, and operator control unit.

FIG. 6 is a cross sectional view of an exemplary embodiment of a chassis adapter of FIG. 3, taken along line 4-4 of FIG. 3, and including a schematically-illustrated charging plug, robot, and operator control unit. The system comprises a remote vehicle (labeled as a robot), an operate control unit in communication with the remote vehicle (e.g., via a wireless connection such as an RF link) to remotely control the remote vehicle. The system also comprises a power source assembly such as the chassis adapter embodiment illustrated in FIG. 5 and connected batteries, to supply power to the remote vehicle. In certain embodiments of the present teachings, the power source assembly comprises at least one rechargeable power source such as a rechargeable battery, and a chassis adapter including charger input contacts and magnets. Lastly, the illustrated system embodiment includes a charging plug with contacts that are adapted to mate with the charger input contacts of the power source assembly, and an electromagnet that, with the magnets of the power source assembly, allows releasable engagement of the charging plug and the power source assembly. The charging plug can be, for example tethered to station that includes at least a power source and can also include hardware to store and/or process the data received from the power source assembly. The operator control unit can be used to drive the remote vehicle into a proper position for mating of the charging plug with the power source assembly, and can also be used to drive the remote vehicle away from the a charging position when the vehicle has finished charging, causing the power source assembly to break away from the charging plug. In certain embodiments of the present teachings, the electromagnets can be unpowered when charging is finished to facilitate disengagement of the charging plug from the power source assembly. Power and data are also exchanged between the power source assembly and the robot. As stated above, in certain embodiments of the present teachings, power from the power source assembly to the robot ceases while the power source assembly is charging, and the charging plug is used to power the robot directly. Data is exchanged between the operator control unit and the robot in a known manner.

Figure 7:
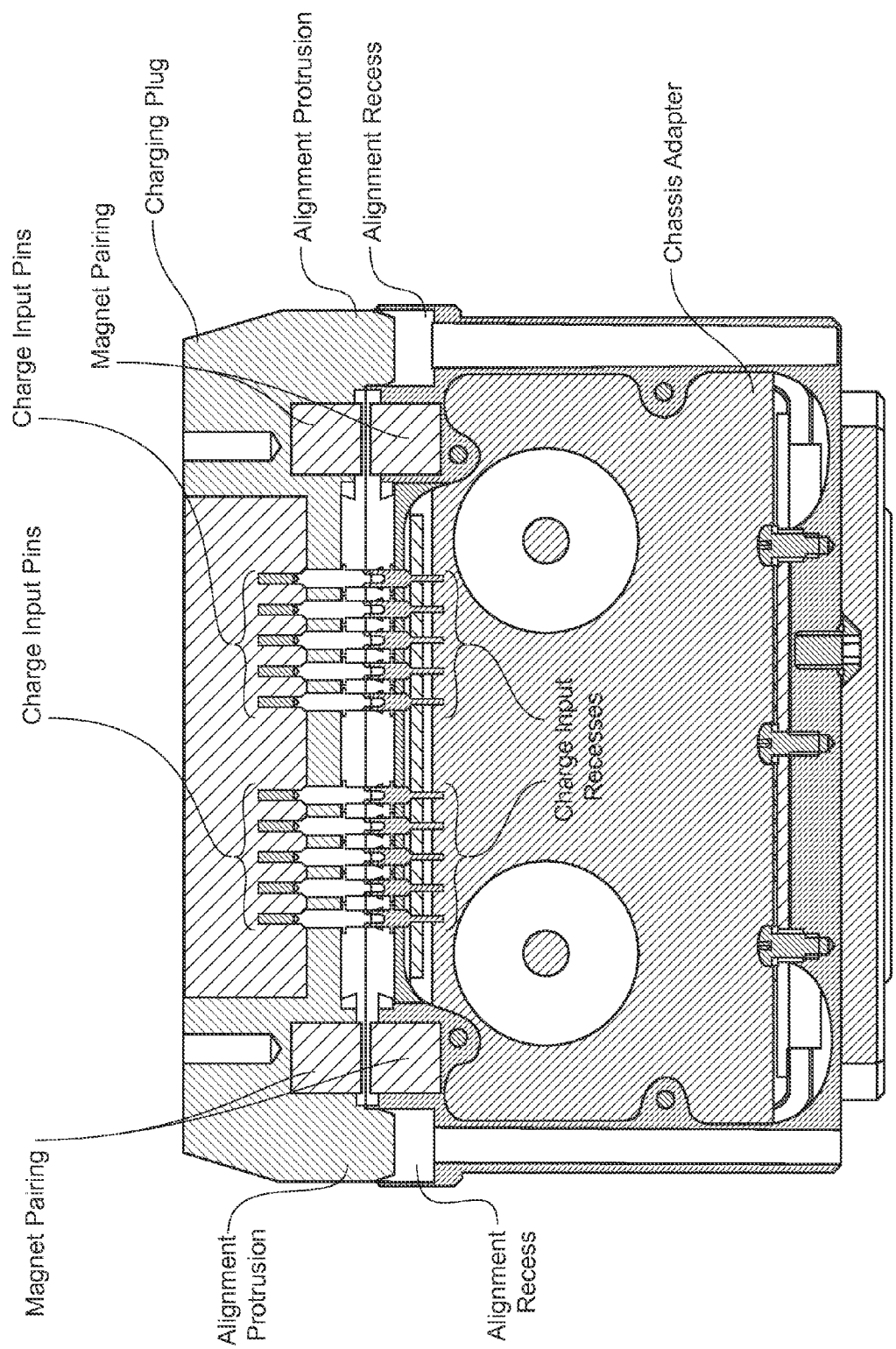
FIG. 7 is another cross sectional view of an exemplary embodiment of a power source assembly adapter of FIG. 3, taken along line 4-4 of FIG. 3, and having a charging plug engaged therewith.

FIG. 7 is another cross sectional view of an exemplary embodiment of a power source assembly adapter of FIG. 3, taken along line 4-4 of FIG. 3, and having a charging plug engaged therewith. As shown, male power and data plug contacts on the charging plug are mated with appropriate female power and data contacts in the chassis adapter. In addition, a magnet of the charging plug is located adjacent a magnet of the chassis adapter. The magnets allow the charging plug to releasably engage the chassis adapter and the power source assembly during charging of the rechargeable power sources therein. In certain embodiments of the present teachings, the charging plug additionally includes an alignment feature, illustrated as a protrusion, which can fit within a recess of the chassis adapter of the power source assembly to assist in aligning the charging plug and the chassis adapter of the power source assembly for mating.

Figure 8:
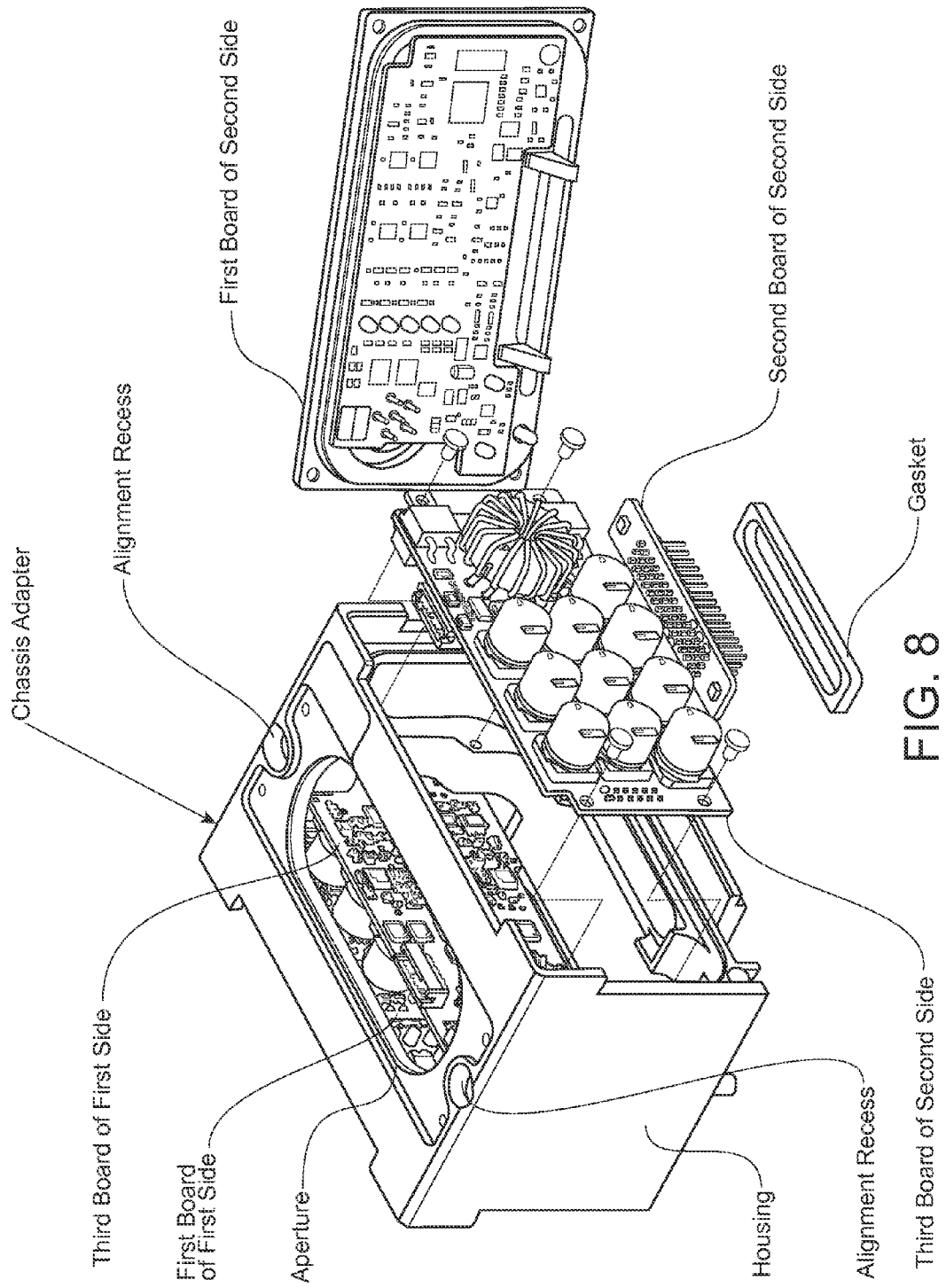
FIG. 8 illustrates another embodiment of a chassis adapter in accordance with the present teachings.

FIG. 8 illustrates another embodiment of a charger contact in accordance with the present teachings having an alternate arrangement of charger input contacts, which includes a lesser number of contacts. The chassis adapter can be installed in either of two physically possible ways, and the charging plug can be installed regardless of the adapter's orientation. In various embodiments, the two pins (pins 8 and 9) which are not in line with the other seven pins (pins 1-7) are shorter. These two pins (pins 8 and 9) are "connection sense" pins for ensuring that the seven center pins (pins 1-7) are not powered until there is a reliable physical & magnetic connection between the chassis adapter and charging plug by making contact last during engagement and disconnecting first during disengagement. In various embodiments, there are current limits on all of the pins in case there is a short from water or other external conductive debris. In various embodiments, the magnetic features of the chassis adapter are only actively magnetic to attract the charging plug when the charging plug is engaged with the chassis adapter, to prevent external ferrous debris from attaching itself to the robot as it drives through its environment.

In certain embodiments, the chassis adaptor can charge either one or two batteries simultaneously. The adapter's sockets will only be powered if a battery is present and only if the battery is of a correct type (i.e., the chassis adapter recognizes the presence and type of the battery and performs accordingly). In certain embodiments, as stated above, the chassis adapter, the charging plug, and the charging station can directly power the remote vehicle while being charged. This can facilitate a "constant on" state for the robot, preventing the need for a boot-up needed for a subsequent mission.

The first through third boards on each side of the chassis adapter can include, for example, a power board, a logic board, and a payload board. The three boards provide an interface between the remote vehicle and the power sources, and may not be directly related to the in situ charging.

The exemplary embodiment of FIG. 8 illustrates a chassis adapter housing having an aperture on a top surface and housing three boards on each side thereof—a power board, a logic board, and a payload port board. An environmental seal for the payload port PCBA is also shown. Two alignment recesses are located on an upper surface of the chassis adapter housing. FIG. 9 is another disassembled view of the chassis adapter of FIG. 8, showing how each of the boards on a side of the chassis adapter of FIG. 8 is assembled into the chassis adapter housing. A faceplate seal is shown, along with a faceplate (to which the logic board is attached) with battery connectors. FIG. 10 is another disassembled view of the chassis adapter of FIG. 8, showing how a plate including a charging connector interface (having, for example, nine recesses for mating with corresponding pins of the charging plug) is assembled to a top surface of the chassis adapter housing. A ferrous slug is located on either side of the charging connector interface. FIG. 10 also illustrates the battery connector or battery SMBUS and power contacts. FIG. 11 illustrates a partially disassembled bottom view of a chassis adapter, showing a payload port on each side thereof.

FIG. 12 illustrates an exploded view of an exemplary embodiment of a charging plug that can be utilized to mate with a chassis adapter, for example the chassis adapter of FIGS. 8-11. The charging plug can include, for example, a housing and a face plate. Charger interface board and an environmental seal are shown, along with pins and pin shells for male connector pins of the charging plug. The pin shells are inserted through holes in the faceplate. A pin is inserted into each of the pin shells. In the illustrated embodiment, the face plate also houses two magnets and two alignment pins. The alignment pins can be used to align the charging plug with the chassis adapter, by being inserted into complementary recesses in the chassis adapter. A strain relief is shown, which can be used to connect the illustrated plug housing to a power cable.

FIG. 13 illustrates an exemplary mating face of the charging plug face plate of FIG. 12. As shown, the mating face includes alignment pins on each side thereof, and magnets on each side thereof. In the illustrated embodiment, the alignment pins are located at outer edges of the faceplate, and the magnets are located inwardly therefrom. The faceplate also includes nine input contact pins, including two grounds, a central pin to power the robot during charging, a power pin for each battery to which the chassis adapter connects, a data pin for each batter to which the chassis adapter connects, and two connection sense pins for ensuring that the other contact pins are not powered until there is a reliable physical & magnetic connection between the chassis adapter and connector by making contact last during engagement and disconnecting first during disengagement.

Figure 14:
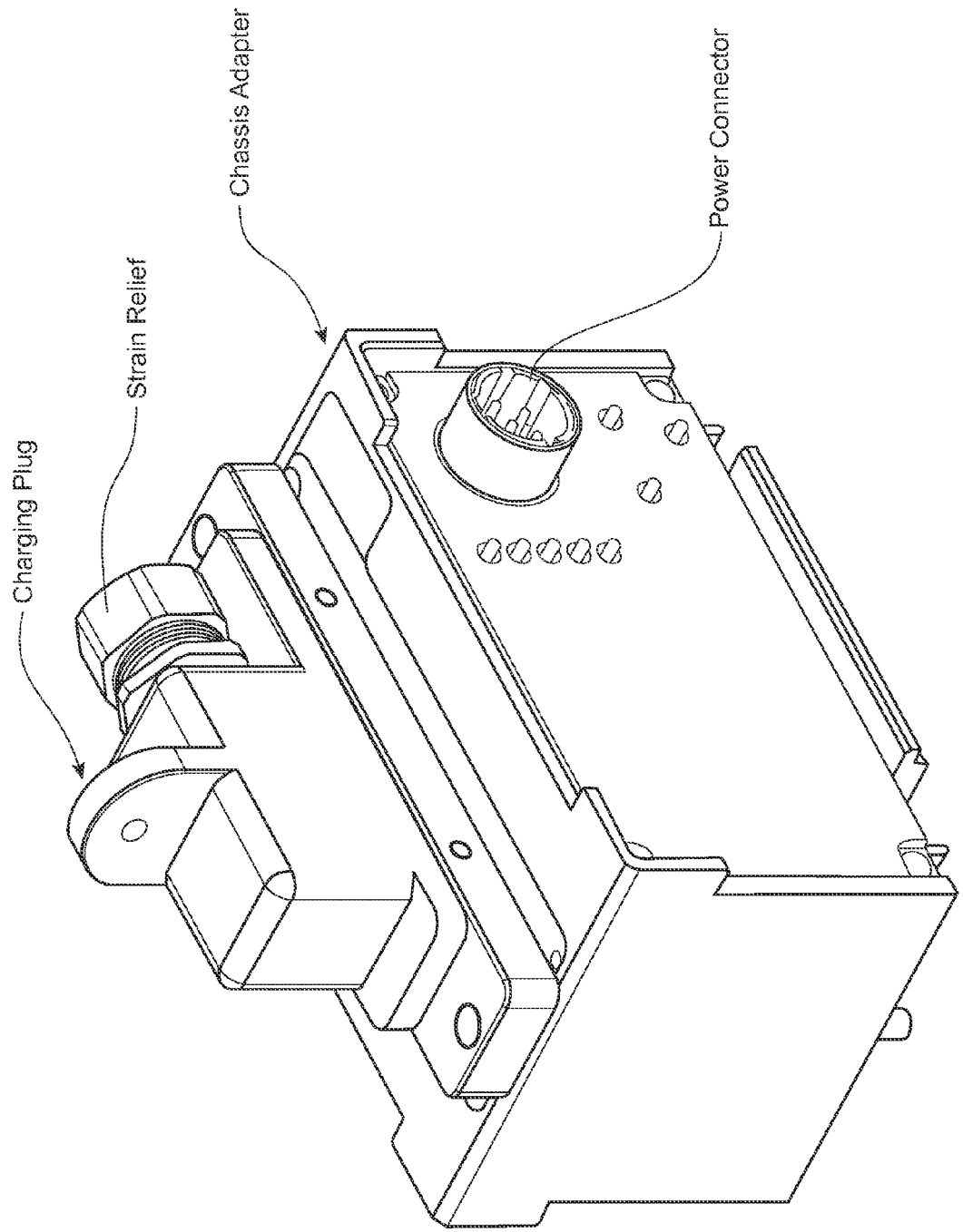
FIG. 14 is a perspective view of a charging plug releasably engaged with a chassis adapter in accordance with embodiments of the present teachings.
Figures 15, 16:
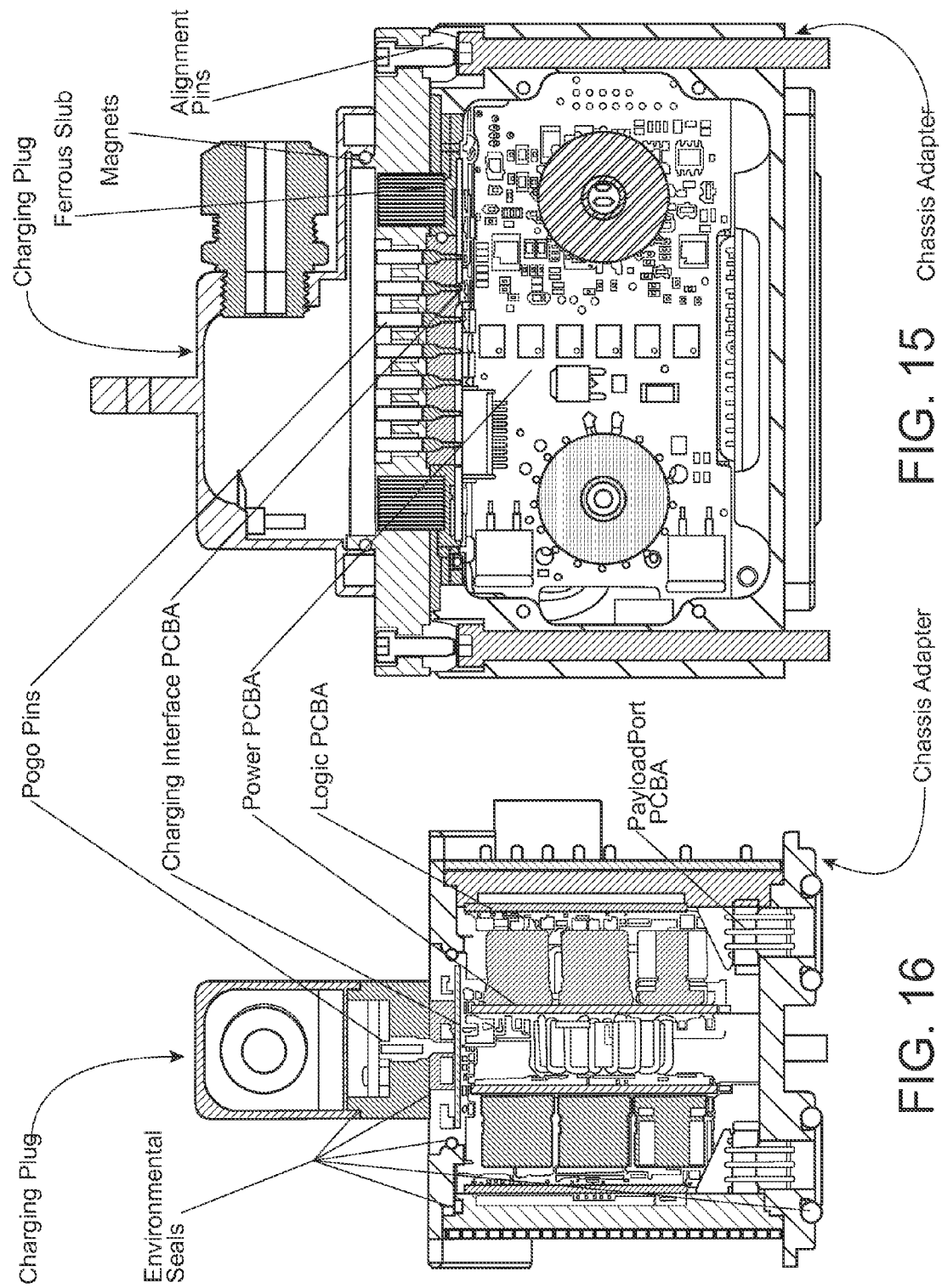
FIG. 15 is a cross sectional view of a mated charging plug and chassis adapter of FIG. 14 in accordance with an exemplary embodiment of the present teachings.
FIG. 16 provides another cross sectional view of the mated charging plug and chassis adapter of FIGS. 14 and 15.

FIG. 14 is a perspective view of a charging plug releasably engaged with a chassis adapter in accordance with embodiments of the present teachings. FIG. 15 is a cross sectional view of a mated charging plug and chassis adapter of FIG. 14 in accordance with an exemplary embodiment of the present teachings. FIG. 15 shows engagement of the charging plug of FIGS. 12 and 13 with the chassis adapter of FIGS. 8 through 11. As shown, the pins of the charging plug mate with corresponding recesses of the chassis adapter, and alignment pins of the charging plug are inserted into corresponding alignment recesses of the chassis adapter. Magnets of the charging plug releasably retain the charging plug to the chassis adapter by their magnetic attraction to the ferrous slugs of the chassis adapter.

FIG. 16 provides another cross sectional view of the mated charging plug and chassis adapter of FIG. 14. FIG. 16 shows engagement of the charging plug of FIGS. 12 and 13 with the chassis adapter of FIGS. 8 through 11. As shown, the pins of the charging plug mate with corresponding recesses of the chassis adapter. Multiple environmental seals can be used in the charging plug and the chassis adapter as shown. Location of the charger interface board within the charging plug is shown, as is the location of the power board, the logic board, and the payload port board within the chassis adapter.

On skilled in the art will understand that each side of the remote vehicle can have one or two batteries, independently. For example, the remote vehicle can have one battery on each side, can have two batteries on each side, can have one battery on one side and two batteries on another side, or can have two batteries on each side. Thus, a remote vehicle can have from one to four batteries, although preferred embodiments include at least two batteries due to the voltage demand from the drive motors; however, the present teachings contemplate that certain remote vehicles will operate with a single battery.

In an exemplary charging method, the remote vehicle includes a chassis adapter and one or more rechargeable power sources, and is driven either autonomously or manually (e.g., via an operator control unit in a known manner) to a location proximate a recharging system in accordance with the present teachings. One or more charging plugs of the recharging system are manually and releasably engaged with the chassis adapter. Engagement is facilitated by placing alignment protrusions into alignment recesses, as pins of the charging plug are inserted into receptacles of the chassis adapter. A magnetic pairing facilitates the releasable engagement of the charging plug and the chassis adapter. When the rechargeable power sources have reached a desire level of recharging, manual intervention is not needed to remove the charging plug from the chassis adapter. The remote vehicle can be driven manually or autonomously away from the charging station and the charging plug will disengage from the chassis adapter when a separation force caused by driving the remote vehicle overcomes the attraction force of the magnetic coupling that holds the charging plug to the chassis adapter.

Other embodiments of the present teachings will be apparent to those skilled in the art from consideration of the specification and practice of the teachings disclosed herein. It is intended that the specification and examples be considered as exemplary only, with a true scope and spirit of the present teachings being indicated by the following claims.

What is claimed is:

1. A system for in situ charging of at least one rechargeable power source of a remote vehicle, the system comprising:
   a power recharger having charger contacts; and
   a chassis adapter at least partially enclosing the at least one rechargeable power source and retaining the at least one rechargeable power source on the remote vehicle, the chassis adapter comprising charger input contacts configured to mate with the charger contacts of the power recharger, the charger input contacts including a positive contact, a ground, and one or more data contacts separate from the positive contact, the chassis adapter including terminals in communication with at least the positive contact and the ground and configured to mate with the at least one rechargeable power source for charging the at least one rechargeable power source;
   wherein when the power recharger engages and supplies power to the chassis adapter, the chassis adapter:
      directly powers the remote vehicle while charging the at least one rechargeable power source, allowing the at least one rechargeable power source to not supply power to the remote vehicle while charging; and
      monitors a charging current to the at least one rechargeable power source; and
   wherein the power recharger automatically disengages from the charger input contacts when the remote vehicle is driven away from the chassis adapter without damaging the power recharger.

2. The system of claim 1, wherein the at least one rechargeable power source comprises two power sources.

3. The system of claim 2, wherein the rechargeable power sources comprise rechargeable batteries.

4. The system of claim 1, wherein, during charging, the remote vehicle can be powered on or off.

5. The system of claim 1, wherein the power recharger and the chassis adapter further comprise magnets that allow the power recharger to releasably engage the chassis adapter during charging.

6. A method for in situ charging of at least one rechargeable power source of a remote vehicle, the method comprising:
   attaching a releasable power recharger having charger contacts to a chassis adapter, the chassis adapter at least partially encloses the at least one power source and retains the at least one power source on the remote vehicle, the chassis adapter comprising charger input contacts configured to mate with the charger contacts of the power recharger, the charger input contacts including a positive contact, a ground, and one or more data contacts separate from the positive contact, the chassis adapter including terminals in communication with at least the positive contact and the ground and configured to mate with the at least one rechargeable power source for charging the at least one rechargeable power source;
   wherein when the power recharger engages and supplies power to the chassis adapter, the chassis adapter:

directly powers the remote vehicle while charging the at least one rechargeable power source, allowing the at least one rechargeable power source to not supply power to the remote vehicle while charging; and monitors a charging current to the at least one rechargeable power source; and automatically disengaging the charger contacts of the releasable power recharger from the charger input contacts of the chassis adapter when the remote vehicle is driven away from the releasable power recharger without damaging the releasable power recharger.

7. The method of claim 6, wherein the at least one rechargeable power source comprises two power sources.

8. The method of claim 7, wherein the rechargeable power sources comprise rechargeable batteries.

9. The method of claim 6, further comprising turning the remote vehicle off or on during recharging.

10. The method of claim 6, wherein the power recharger and the chassis adapter further comprise magnets that allow the power recharger to releasably engage the chassis adapter during charging.

11. A system for in situ charging of at least two rechargeable power sources of a remote vehicle, the system comprising a remote vehicle and an operator control unit for controlling the remote vehicle, and further comprising:

two power rechargers, each having charger contacts; and two chassis adapters, each chassis adapter at least partially enclosing at least one respective rechargeable power source and retaining the respective at least one rechargeable power source on the remote vehicle, and each of the chassis adapters comprising charger input contacts configured to mate with the charger contacts of one of the power rechargers, the charger input contacts including a positive contact, a ground, and one or more data contacts separate from the positive contact, each chassis adapter including terminals in communication with at least the corresponding positive contact and the corresponding ground and configured to mate with at least one rechargeable power source for charging the at least one rechargeable power source;

wherein when each power recharger engages and supplies power to the corresponding chassis adapter, the corresponding chassis adapter:

directly powers the remote vehicle while charging the at least one rechargeable power source, allowing the at least one rechargeable power source to not supply power to the remote vehicle while charging; and monitors a charging current to the at least one rechargeable power source; and wherein the power rechargers automatically disengage from the respective chassis adapter when the remote vehicle is driven away from the chassis adapter without damaging the chassis adapter.

12. The system of claim 11, wherein the at least one rechargeable power source comprises two power sources.

13. The system of claim 12, wherein the power sources comprise rechargeable batteries.

14. The system of claim 11, wherein, during charging, the remote vehicle can be powered on or off.

15. The system of claim 11, wherein each of the power rechargers and each of the chassis adapters further comprise magnets that allow the power recharger to releasably engage the chassis adapter during charging.

16. The system of claim 15, wherein each chassis adapter includes at least two magnets spaced from each other and from the charging input contacts, for each chassis adapter, the at least two magnets aligning one of the power chargers with the corresponding chassis adapter so that the charging contacts of the aligned power charger mate with the charging input contacts of the respective chassis adapter.

17. The system of claim 11, wherein the chassis adapters are located on opposite sides of the remote vehicle, at a track center location.

18. The system of claim 11, wherein each of the chassis adapters comprises at least seven charger input contacts including a positive contact, a ground, and one or more data contacts.

* * * * *